R. E. DRENNON.
GAS ENGINE VALVE.
APPLICATION FILED FEB. 21, 1912.
1,084,410.
Patented Jan. 13, 1914.
2 SHEETS—SHEET 1.
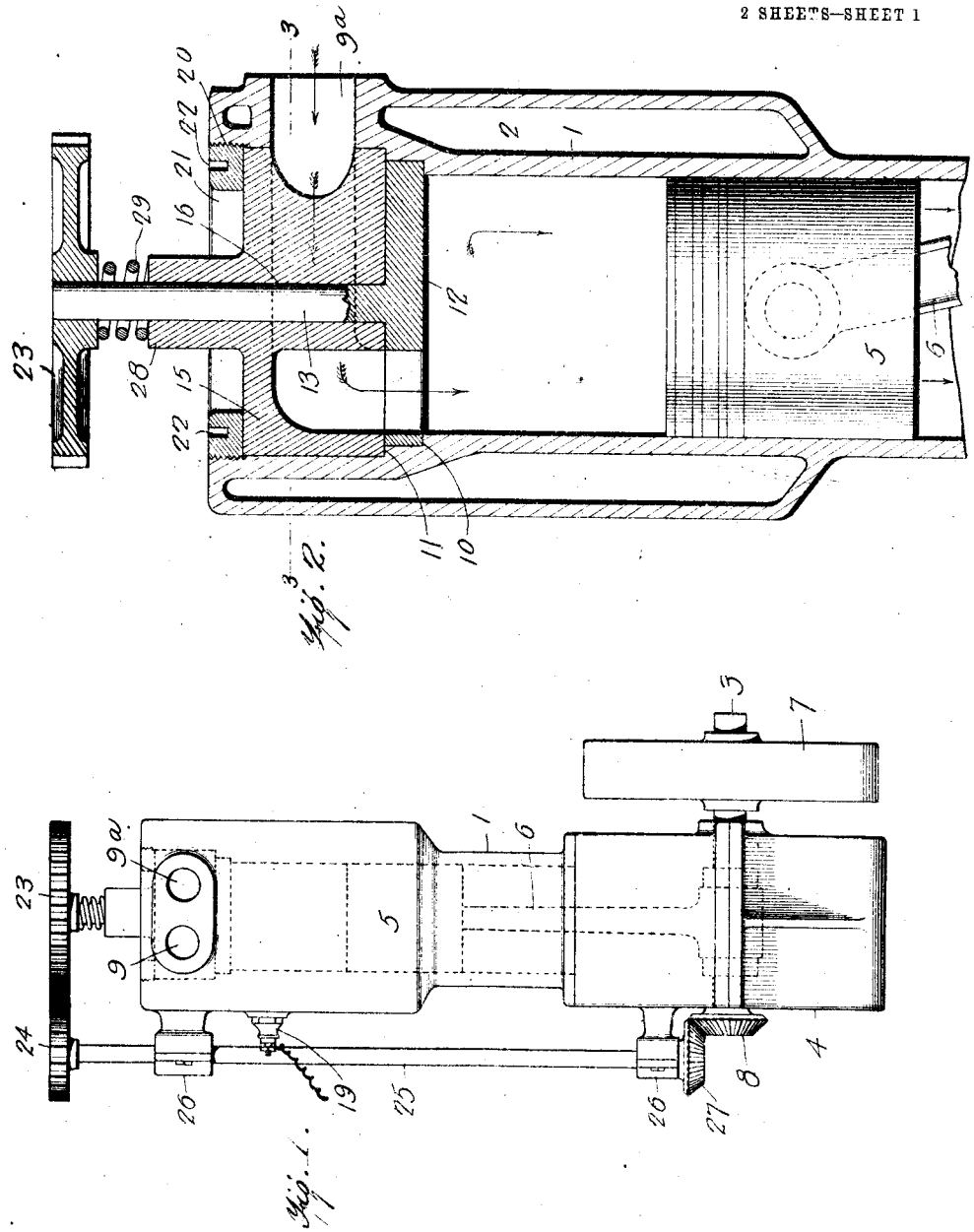
WITNESSES
INVENTOR
RALEIGH E. DRENNON,
BY
ATTORNEYS

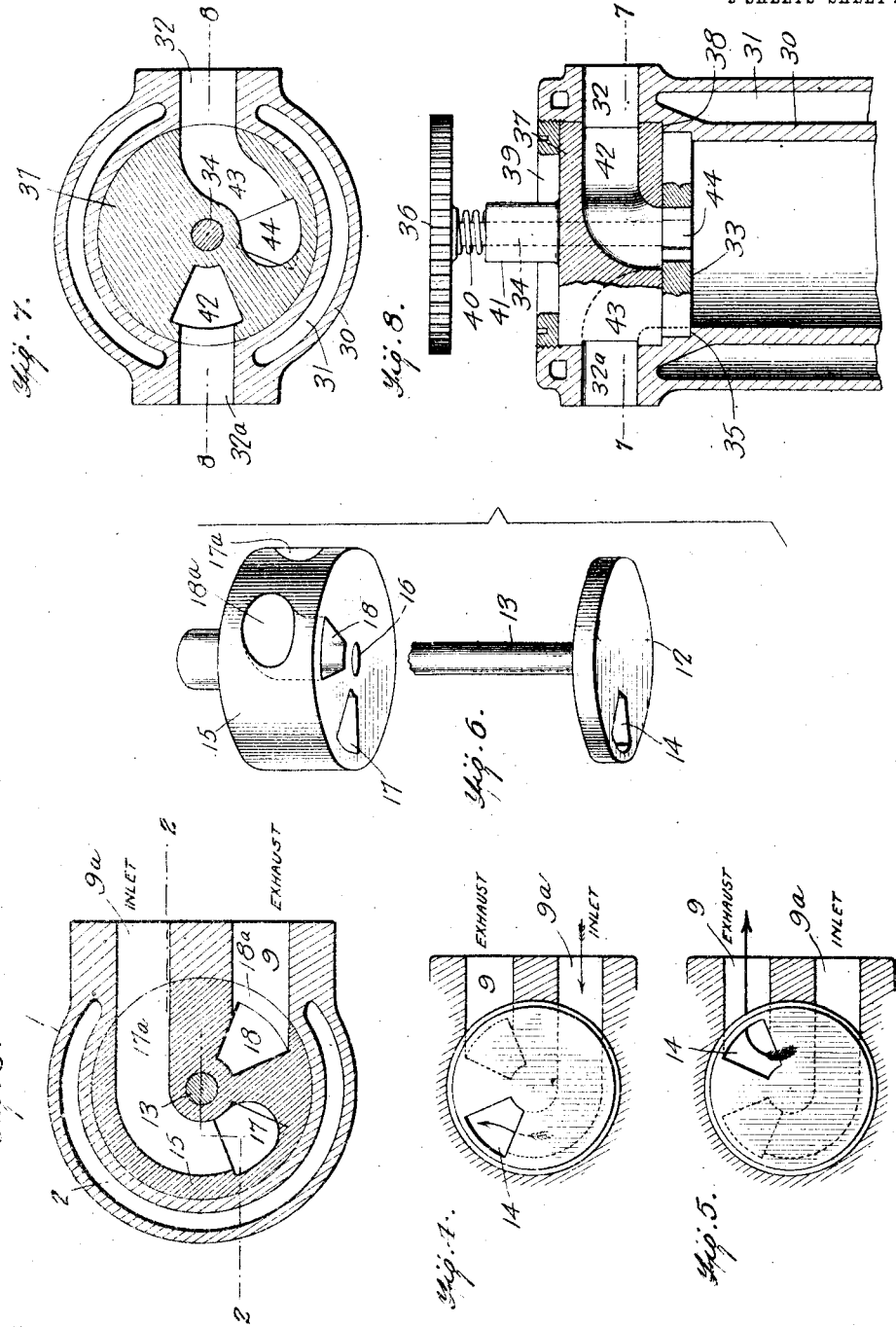

UNITED STATES PATENT OFFICE.

RALEIGH EUGENE DRENNON, OF ATLANTA, GEORGIA.

GAS-ENGINE VALVE.

1,084,410.      Specification of Letters Patent.     Patented Jan. 13, 1914.

Application filed February 21, 1912. Serial No. 679,055.

*To all whom it may concern:*

Be it known that I, RALEIGH E. DRENNON, a citizen of the United States, and a resident of Atlanta, in the county of Fulton and State of Georgia, have invented certain Improvements in Gas-Engine Valves, of which the following is a specification.

The object of the invention is to provide a device of the character specified, wherein a single rotating valve with a large bearing surface is utilized for controlling both the inlet and the exhaust, operated directly from the crank shaft, and so arranged that when the valve is removed access is permitted to every part of the cylinder.

In the drawings: Figure 1 is a front elevation of the improvement; Fig. 2 is a vertical section; Fig. 3 is a section on the line 3—3 of Fig. 2; Figs. 4 and 5 are diagrammatic views of the valve from below showing the said valve in its open periods; Fig. 6 is a perspective view of the valve and seat; Fig. 7 is a section of a modified form, on the line 7—7 of Fig. 8; and, Fig. 8 is a section on the line 8—8 of Fig. 7.

In the present embodiment of the invention, the cylinder 1 is provided with an annular chambered portion 2 at the end remote from the crank shaft 3, and the said shaft is journaled in a crank case 4 connected to the cylinder end. The piston 5 is connected to the crank shaft by a rod 6, and the shaft has a pulley 7 at one end, outside of the crank case, and a bevel gear wheel 8 at the other end.

The cylinder is provided with lateral ports 9 and 9ª, near the end remote from the crank shaft, and the said end is internally enlarged to form two annular shoulders 10 and 11, and the cylinder is internally threaded at the extreme end beyond the shoulder 11. A disk 12 provided with an axial stem 13 is seated in the said end of the cylinder on the shoulder 10. The disk is provided with a passage or port 14, at one side of its center, and a second disk 15 of greater thickness than disk 12 is seated on shoulder 11. Disk 12 is of such thickness that when seated on shoulder 10 the outer face of the disk is flush with shoulder 11, and the inner face of disk 15 fits the outer face of disk 12 closely.

Disk 15 has a central axial opening 16 for stem 13, and the said disk is provided with two passages or ports 17 and 18, of the same size and shape as passage 14, and similarly located, so that either passage 17 or 18 may register with passage 14. The passages 17 and 18 do not extend through to the outer face of disk 15, but connect with radial passages 17ª and 18ª opening at the side of the disk. The passage 18ª is straight and direct, while passage 17ª extends in arc form around the center of the disk, as shown more particularly in Fig. 3, and the said passages 17ª and 18ª are arranged to register with the ports 9ª and 9 of the cylinder. The port 9 is the exhaust port, and port 9ª is the inlet port, and the cylinder is provided with the usual spark plug 19.

The disk 15 is of such thickness that the outer face thereof is flush or slightly above the commencement of the threaded portion 20, and a ring 21 is threaded into the end of the cylinder for holding the disks in place. The said ring is provided with openings 22, for engagement by a spanner or like tool to permit the removal of the ring.

A gear wheel 23 is secured to the stem 13, and the said wheel meshes with a gear wheel 24, on a shaft 25, journaled in sectional bearings 26 on the cylinder. A bevel gear wheel 27 is secured to the opposite end of the shaft from the wheel 24, and the wheel 27 meshes with the wheel 8 on the crank shaft.

The disk 15 is provided with an axial hub 28 on its outer face, the hub encircling the stem 13, and a spring 29 is arranged on the stem between the gear wheel and the end of the hub. The shaft 25 is rotated continuously from the crank shaft, and the disk or valve 12 is also moved continuously by the shaft 25.

In operation when the piston has reached the end of its working stroke after the ignition of the charge, and begins to move upward, port 14 is in register with ports 18—18ª—9 and the products of combustion or exhaust, are driven from the cylinder. When the piston begins again to move downward port 10 is in register with port 17—17ª—9ª and a charge is drawn into the cylinder. The port 17—17ª and 9ª is closed as soon as the piston reaches the end of its downward stroke, and remains closed, together with port 18—18ª 9, until the piston has reached the end of its downward or working stroke, the charge being ignited when the piston begins the said downward or working stroke. The ports 17 and 18 are so arranged that during each four periods, each port is open during one period and closed during three periods. The port 18 is open during one period, the port 17 during the next period, and both are closed during the two succeeding periods. The first position of the valve, that is the position of the valve during the first period is shown in Fig. 5, the port 18—18ª 9 being open. The second period is shown in Fig. 4, the port 17—17ª 9ª being open.

In the embodiment shown in Figs. 7 and 8, the cylinder 30 is jacketed, as shown at 31, and the end remote from the crank case has oppositely arranged ports 32 and 32ª. The disk or valve 33 has the axial stem 34 and is seated on the annular shoulder 35. The gear wheel 36 is secured to the outer end of the stem, and the disk 37 is seated on the annular shoulder 38 of the cylinder, and is held in place by the ring 39, in the same manner as in the construction of Figs. 1 to 6.

The spring 40 is arranged on the stem between the wheel and the end of hub 41, and the disk 37 is provided with the ports or passages 42 and 43, each port or passage having a radial portion in the disk. The valve 33 is provided with the port 44 for registering with ports 42 and 43, and the operation is precisely the same as that of the constructions shown in Figs. 1 to 6, the difference being merely in construction.

The port 44, as shown in Fig. 7, is in register with port 43, which is the inlet port for the charge. The cylinder will be closed during the next two periods, and during the fourth period port 44 will be in register with port 32ª to permit the products of combustion to exhaust.

All of the parts in both forms are easily accessible for cleaning or repairs, and the springs 29 and 40 hold the valve snugly against the adjacent face of disk 15 or 37, the said disks being the valve seats. The counterboring of the cylinders to form the shoulders for the valve seats, prevents the valves dropping into the cylinders, should the stem break, or the parts become disengaged.

The cylinder in the improvement has both ends open, one end being closed by the crank case and the other by the valve and valve seat. The valve is large, and has a large bearing surface, and hence wears evenly and smoothly, so that the fit is good and tight at all times. Should deposits of carbon occur they may be easily removed. When the valve and seat are removed, every part of the cylinder is open to inspection.

I claim,

1. An engine comprising a cylinder, a crank case at one end of the cylinder, a crank shaft journaled in the case, a piston in the cylinder, a rod connecting the piston to the crank shaft, the end of the cylinder remote from the crank shaft being counterbored to form a plurality of annular shoulders spaced apart from each other, and the outer end of the counterbored portion being threaded, a disk valve seated on the innermost shoulder, said valve having an eccentric port and an outwardly extending axial stem, a disk valve seat seated on the outermost shoulder and contacting with the outer face of the valve and having an axial opening for the stem, said seat having a plurality of passages, each passage opening at one end on the lower face of the seat alongside each other and in position to register with the port of the valve, and extending at the other end radially and opening at the side of the seat, the cylinder having lateral ports registering with the radial portions of the said passages, a ring threaded into the cylinder for locking the valve and seat in place, a gear wheel on the stem, a spring on the stem between the gear wheel and the seat, a valve shaft journaled longitudinally of the cylinder, a pinion on the shaft meshing with the gear wheel, and a driving connection between the crank shaft and the valve stem.

2. An engine comprising a cylinder, a crank case at one end of the cylinder, a crank shaft journaled in the case, a piston in the cylinder, a rod connecting the piston to the crank shaft, the end of the cylinder remote from the crank shaft being counterbored to form a plurality of annular shoulders spaced apart from each other, and the outer end of the counterbored portion being threaded, a disk valve seated on the innermost shoulder, said valve having an eccentric port and an outwardly extending axial stem, a disk valve seat seated on the outermost shoulder and contacting with the outer face of the valve and having an axial opening for the stem, said seat having a plurality of passages, each passage opening at one side on the lower face of the seat alongside each other and in position to register with the port of the valve, and extending at the other end radially and opening at the side of the seat, the cylinder having lateral ports registering with the radial portions of the said passages, a ring threaded into the cylinder for locking the valve and seat in place, a driving connection between the stem and the crank shaft, and a spring pressing the valve toward the seat.

3. An engine comprising a cylinder, a crank case at one end of the cylinder, a crank shaft journaled in the case, a piston in the cylinder, a rod connecting the piston to the crank shaft, the end of the cylinder remote from the crank shaft being counterbored to form a plurality of annular shoulders spaced apart from each other, a disk valve seated on the innermost shoulder, said valve having an eccentric port and an outwardly extending axial stem, a disk valve seat seated on the outermost shoulder and contacting with the outer face of the valve and having an axial opening for the stem, said seat having a plurality of passages, each passage opening at one end on the lower face of the seat alongside each other and in position to register with the port of the valve, and extending at the other end radially and opening at the side of the seat, the cylinder having lateral ports registering with the radial portions of the said passages, means for locking the seat to the cylinder, a spring pressing the valve to the seat, and a driving connection between the stem and the crank shaft.

RALEIGH EUGENE DRENNON.

Witnesses:
 WALDO C. PUCKETT,
 WALTER C. HENDRIX.